(12) United States Patent
Matsuzawa (10) Patent No.: US 8,489,709 B2
(45) Date of Patent: Jul. 16, 2013

(54) METHOD OF MANAGING A FILE ACCESS IN A DISTRIBUTED FILE STORAGE SYSTEM

(75) Inventor: Keiichi Matsuzawa, Arlington, MA (US)

(73) Assignee: Hitachi, Ltd., Tokyo (JP)

( * ) Notice: Subject to any disclaimer, the term of this patent is extended or adjusted under 35 U.S.C. 154(b) by 242 days.

(21) Appl. No.: 12/883,844

(22) Filed: Sep. 16, 2010

(65) Prior Publication Data

US 2012/0072540 A1   Mar. 22, 2012

(51) Int. Cl.
*G06F 15/16* (2006.01)
(52) U.S. Cl.
USPC ........... 709/219; 709/226; 709/227; 707/771; 370/338
(58) Field of Classification Search
USPC ............ 709/219, 226–227; 707/771; 370/338
See application file for complete search history.

(56) References Cited

U.S. PATENT DOCUMENTS

| 6,886,035 | B2 | 4/2005 | Wolff |
| 2005/0153778 | A1* | 7/2005 | Nelson et al. .................... 463/42 |
| 2007/0038697 | A1* | 2/2007 | Zimran et al. ................ 709/203 |
| 2009/0083344 | A1* | 3/2009 | Inoue et al. .................... 707/204 |

* cited by examiner

*Primary Examiner* — Wing F Chan
*Assistant Examiner* — Hitesh Patel
(74) *Attorney, Agent, or Firm* — Hitachi America, Ltd.

(57) ABSTRACT

Embodiments of the invention provide methods and systems of managing a file access, in a distributed file system environment. In the provided methods and systems, each of the host computers is connected with one of the file servers as a target file server and issues the file access request to the target file server, for access to a target file stored in at least one of the file servers. The management computer collects load information from the file servers, analyzes it, by specifying location of the target file and the target file server, and based on the analysis, redistributes the target file among the file servers and reallocates connections between the host computers and the target file servers.

13 Claims, 14 Drawing Sheets

CONNECTION TABLE 400

| Host name | Target file server |
|-----------|-------------------|
| A | X |
| B | Y |
| C | Z |
| D | X |
| E | Y |
| F | Z |

Fig. 4(b)

FILE ACCESS LOG 410

| Host name | Target file server | Redirected file server | Filename | Transfer size |
|---|---|---|---|---|
| A | X | X | /root/dirA/file1 | 10MB/min |
| A | X | Y | /root/dirA/file3 | 30MB/min |
| B | Y | X | /root/dirA/file1 | 20MB/min |
| E | Y | Z | /root/dirB/file5 | 40MB/min |
| C | Z | X | /root/dirA/file1 | 20MB/min |
| F | Z | Y | /root/dirC/file8 | 40MB/min |

CONNECTION TABLE

| Host name | Target file server |
|---|---|
| A | X |
| B | X |
| C | Y |
| D | Y |

Fig. 6(C)

FILE ACCESS LOG 670

| Host name | Target file server | Redirected file server | Filename | Transfer size |
|---|---|---|---|---|
| A | X | X | a | 100MB/min |
| B | X | X | c | 40MB/min |
| B | X | Y | d | 20MB/min |
| C | Y | X | a | 30MB/min |
| C | Y | X | b | 50MB/min |
| C | Y | Y | e | 20MB/min |
| D | Y | Y | e | 10MB/min |
| D | Y | Y | f | 40MB/min |

CONNECTION TABLE 760

| Host name 401 | Target file server 402 | |
|---|---|---|
| A | X | 761a |
| B | Y | 761b |
| C | X | 761c |
| D | Y | 761d |

Fig. 7(C)

FILE ACCESS LOG 770

| Host name | Target file server | Redirected file server | Filename | Transfer size |
|---|---|---|---|---|
| A | X | X | a | 100MB/min |
| B | Y | Y | c | 40MB/min |
| B | Y | Y | d | 20MB/min |
| C | X | X | a | 30MB/min |
| C | X | X | b | 50MB/min |
| C | X | X | e | 20MB/min |
| D | Y | X | e | 10MB/min |
| D | Y | Y | f | 40MB/min |

METHOD OF MANAGING A FILE ACCESS IN A DISTRIBUTED FILE STORAGE SYSTEM

BACKGROUND OF THE INVENTION

The present invention relates generally to a method and a system for managing a file access in a distributed file system.

In general, a distributed file system is used to realize a better performance and a larger storage capacity than non-distributed file system. One of the distribution file system approaches is called "in-bound" approach, where each of the host computers issues a request to one of the plurality of file servers as a target server, for access to a target file, and the target server redirects the request to the file server, in which the target file is located. This redirection method enables the host computers to access all the files stored in the file servers by connecting to one of the file servers. However, if the target files are not stored in the connected file server, the connected file server has to redirect repeatedly to the file server which stores the target files, therefore, that consumes bandwidth of the backend network and CPU load of each file server, and the latency for the I/O request becomes long.

In this situation, a load balancing is a useful method to prevent performance bottleneck caused by only a single server allocated to multiple servers. By using a load balancing, each file server comprising a distributed file system is not likely to cause saturation of CPU capacity or other resources until all the file servers equally have too much load.

For example, U.S. Pat. No. 6,886,035 addresses the issues of the bottlenecks and disadvantages associated with the distributed networks, and discloses the load balancing method which allows the clients to optimize throughput between themselves and the resources accessed by the nodes. More specifically, it discloses a method where a client's request for a resource is redirected from one server node to another according to a utilization condition.

However, the invention disclosed in U.S. Pat. No. 6,886,035 is only directed to load balancing between the clients and file servers, and does not resolve the overload between the file servers. Therefore, there is a need to consider load balancing between the file servers as well as load balancing between the clients and the file servers.

BRIEF SUMMARY OF THE INVENTION

Embodiments of the invention provide methods and systems of managing a file access, in a distributed file system environment. In the provided methods and systems, each of the host computers is connected with one of the file servers as a target file server and issues the file access request to the target file server, for access to a target file stored in at least one of the file servers. The management computer collects load information from the file servers, analyzes it, by specifying location of the target file and the target file server, and based on the analysis, redistributes the target file among the file servers and reallocates connections between the host computers and the target file servers.

In an embodiment of the invention, the host computers and the file servers are connected via the frontend network, and the host computer issues the file access request via the frontend network. The file servers are communicated via the backend network, and the target file server redirects the file access request to another file server via the backend network, if the target file server does not store the target file.

In another embodiment of the invention, load information is collected at the management computer. The load information at least includes name of the host computer, name of the target file, and the transfer size, and optionally, name of the target file server and name of redirected file server, so the transfer size between the host computer and the target file server where the target file is located can be understood from the load information.

In yet another embodiment of the invention, each of the host computers accesses the target file, by using a file tree. The file tree comprises a root directory and a subdirectory which has at least one or more files, so each of the host computer can access to the designated target file server by referring to the file tree provided by the target file server.

In yet another embodiment of the invention, according to the transfer size, a target file is migrated from one file server to another file server, so the transfer size is well balanced among the file servers and there will be less traffic between the host computers and the file servers.

In yet embodiment of the invention, according to the transfer size, a host computer is reallocated to the different target file server from the originally allocated target file server, so the transfer size is well balanced among the file servers and there will be less traffic between the host computers and the file servers.

In yet embodiment of the invention, according to the transfer size, a target file is migrated from one file server to another file server and a host computer is reallocated to the different target file server from the originally allocated target file server, so the transfer size is well balanced among the file servers and there will be less traffic between the host computers and the file servers.

DETAILED DESCRIPTION OF THE INVENTION

Exemplary embodiments of the invention, as will be described in greater detail below, provide methods and systems of managing a file access, in a distributed file system environment with a special consideration of load information between the connection of the host computers and the file servers.

Figure 1A:
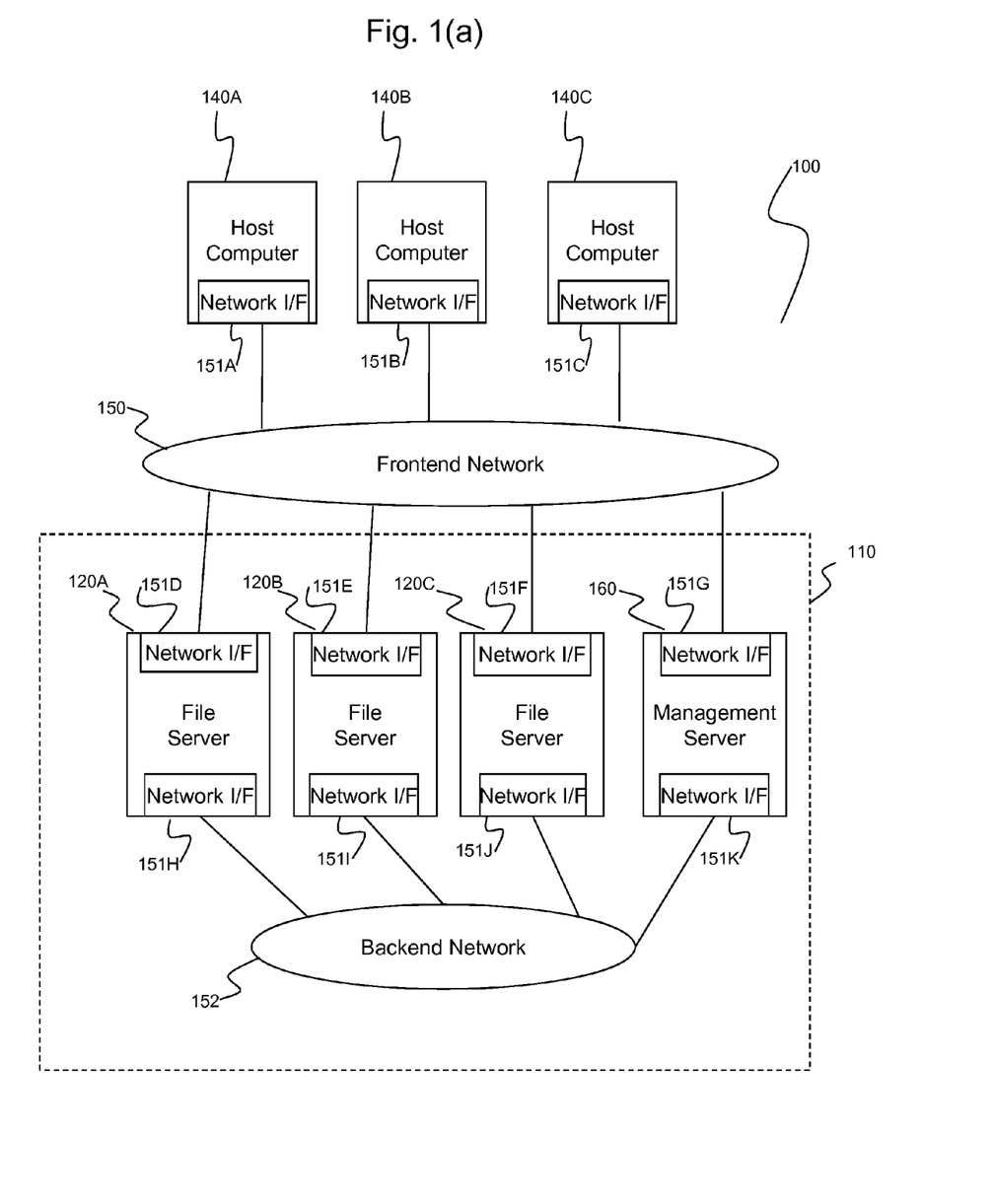
FIG. 1(a)-(c) illustrate an example of an information system overview in which the method of this embodiment is implemented.
Figure 1B:
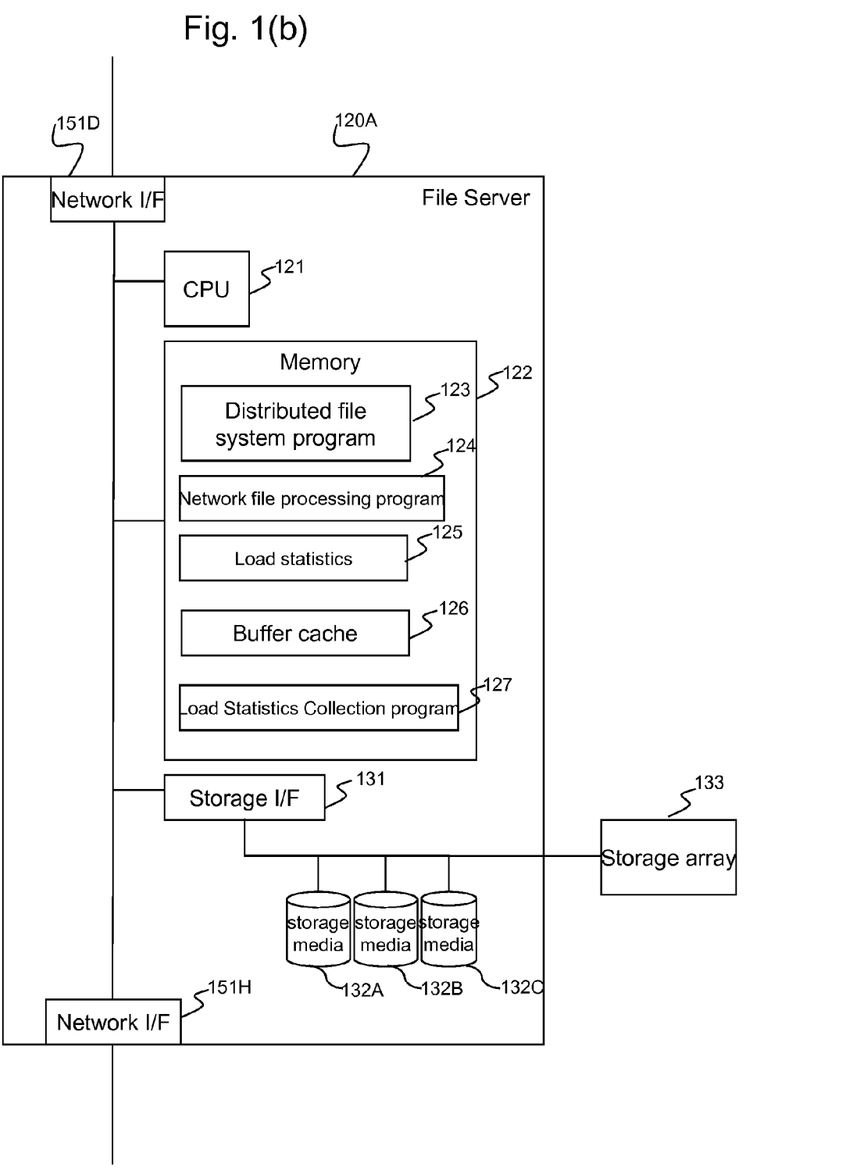
Figure 1C:
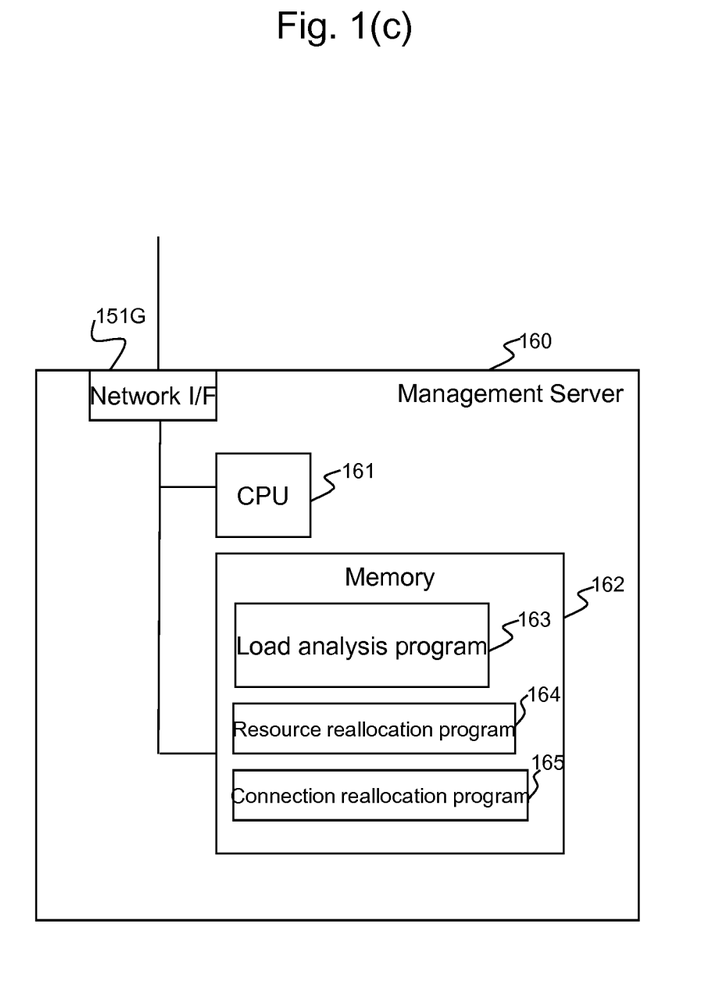

FIGS. 1(a), 1(b) and 1(c) show an example of the information system overview 100 in which the method of this embodiment is implemented. In FIG. 1 (a), a plurality of the host computers 140A-140C, a frontend network 150, a storage system 110 are illustrated. Basically, each host computer 140A, B or C is a user of the storage system 110, and issues file I/O, which includes access request for a target file, by using a network interface (I/F) 151A, B or C, and via a frontend network 150, to a target file server 120A, B, or C respectively.

For the network interface, there are some common protocols for file I/O such as NFS (Network File System), CIFS (Common Internet File System) and AFP (Apple Filing Protocol). Furthermore, each host computer can communicate with other computers for various purposes.

The storage system 110 comprises a plurality of file servers 120A-120C and optionally a backend network 152 and a management computer 160. The file server 120A-120C receives the file I/O from the host computer 140A-140C via the frontend network 150. When the backend network 152 is implemented, the file servers 120 communicate via the backend network 152 by using a network interface 151. This network can be also used to migrate data, to exchange metadata or to control distributed file system. Otherwise, it is possible to merge the function of the backend network 152 to the frontend network 150.

As shown in FIG. 1(b), the file server 120A, for example, further comprises a CPU 121, a memory 122, a storage interface 131 and a network interface 151. The file server 120 may also have storage media 132. CPU 121 controls the devices in the file server 120 as executing the programs in the memory 122. The memory 122 stores some programs such as distributed file system program 123, network file processing program 124 and load statistics collection program 127. The memory 122 also stores load statistics 125 and a buffer cache 126. Especially, CPU 121 processes file I/O requests and reads/writes data from/onto storage media 132A-C or a storage array 133, which is connected via a storage interface 131, referring to the distributed file system program 123. FC (Fibre Channel), SATA (Serial Attached Technology Attachment), SAS (Serial Attached SCSI), IDE (Integrated Device Electronics), or other interfaces are used for communication between CPU 121 and storage interface 131. File server 120 can have many kinds of storage media such as HDD (Hard Disk Drive), SSD (Solid State Drive), flush memories, optical disks and magnetic tapes and their array by RAID (Redundant Array of Independent Disk) technology. Storage array 133 can be used as an external array for the file server 120 as well as storage media 132. CPU 121 creates and stores load statics 125 on the memory 122. The load statistics 125 is collected by load statistics collection program 127 stored in the memory 122 located in the file server through distributed file system program 123, network file processing program 124 and any other status from the file server 120. Each file server 120 has a network interface 151, so it can communicate with other file servers 120, host computers 140 and management computer 160 by using the network interface 151.

FIG. 1(c) illustrates an example of management computer 160, which is optionally included in the storage system 100. The management computer 160 comprises CPU 161, memory 162, and network interface 151. CPU 161 controls the devices in the management computer 160 as executing the programs in the memory 162. CPU 161 collects load statics 125 from file servers 120 and any other information from computers of the information system 100, makes analysis based on the statics, and calculates for better load balancing by referring load analysis program 163. Based on the result of the analysis and calculation, CPU 161 directs the file servers 120 to migrate a file among the file servers 120 for resource re-allocation by referring to resource re-allocation program 162. CPU 161 further directs the host computer or other component in the information system 110 to reallocate connections between the host computers 140 and the file servers 120 by referring to connection re-allocation program 165. The functions performed by these programs can be performed by the same programs located in different management computer or file server.

DFS (Distributed File System) is a kind of network file system. When file servers 120 sharing backend network 152 construct one file system, the file system is considered to be a kind of distributed file system. There are different types of DFSs as to how to distribute data among file servers. Some implementations may distribute data by per-file basis, while others may employ distribution on per-directory basis or split each file to multiple segments and then distribute them among the file servers. Although the embodiments of this invention can be applied to all kinds of DFSs and not limited to any particular type of DFS, this embodiment focuses on a DFS which supports per-file distribution and migration among file servers and one in which each host computer accesses only one file server as a target file server for access to its target file.

Figure 2:
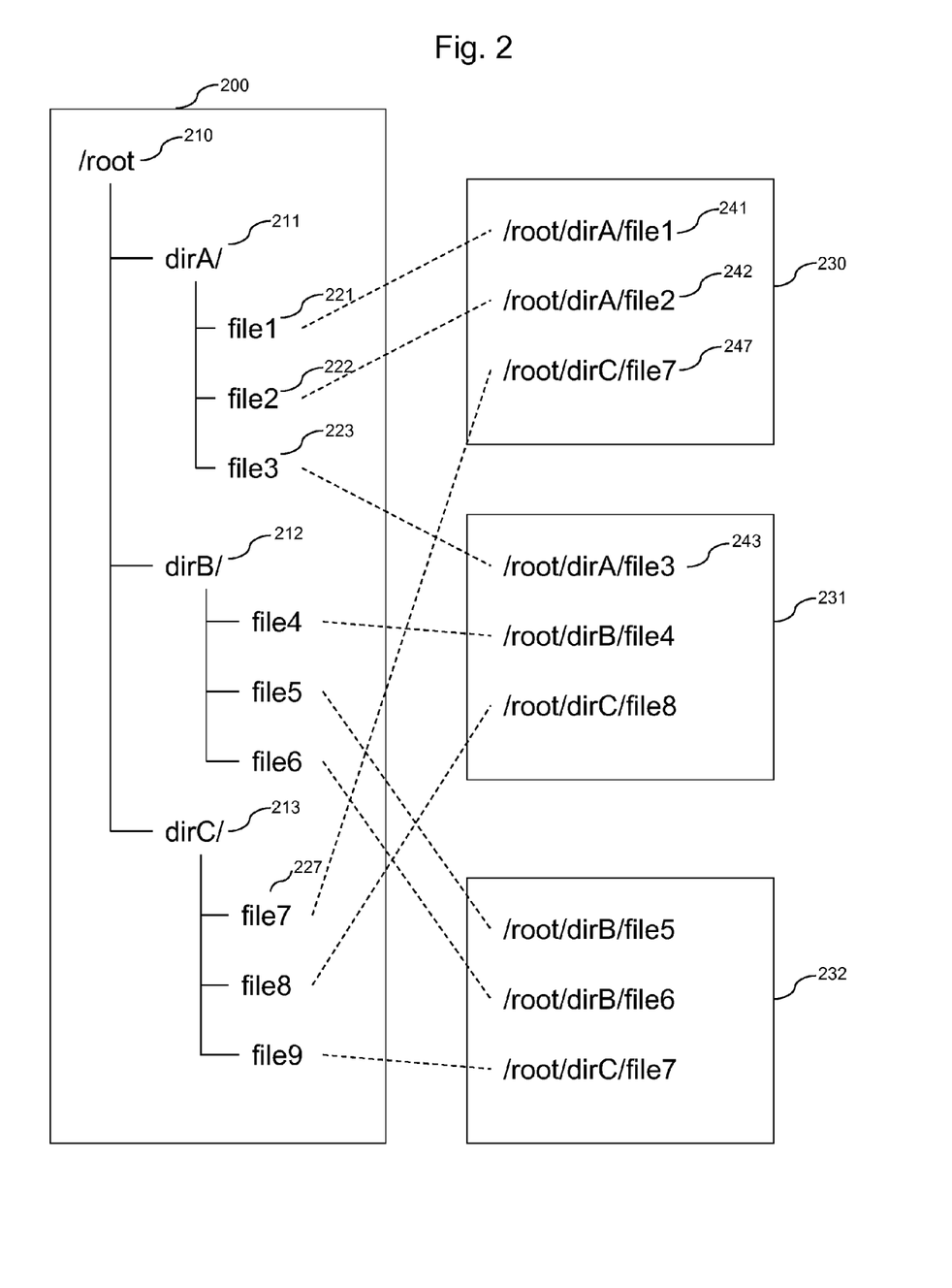
FIG. 2 illustrates an example of a distributed file system of one of the embodiments of the invention.

FIG. 2 illustrates an example of the DFS of one of the embodiments of the invention. File tree 200 shows a file hierarchy and any of the host computers 120 connecting to the file servers 140 can access to any files shown in the file tree 200. File tree 200 has a root 210 and sub-directories 211, 212, and 213, each of which has one or plurality of files such as file 1 (221), file 2 (222), and file 3 (223). In this embodiment, each file is stored in the file server X (230), Y (231), or Z (233). For example, file 1 (221), whose pathname is "/root/dirA/file1/", is stored in the file server X (230). Since the DFS distributes the data by per-file basis, file 1 (221), file (222), or file 3 (223) in the same directory is distributed to different file server X (230), Y (231), or Z (232) while the file server X (230), Y (231), or Z (232) stores files from different directories. Therefore, files can be migrated from one file server to another file server while file tree remains the same with or without migration, so the migration can be performed transparent to the host computers 140.

Figure 3:
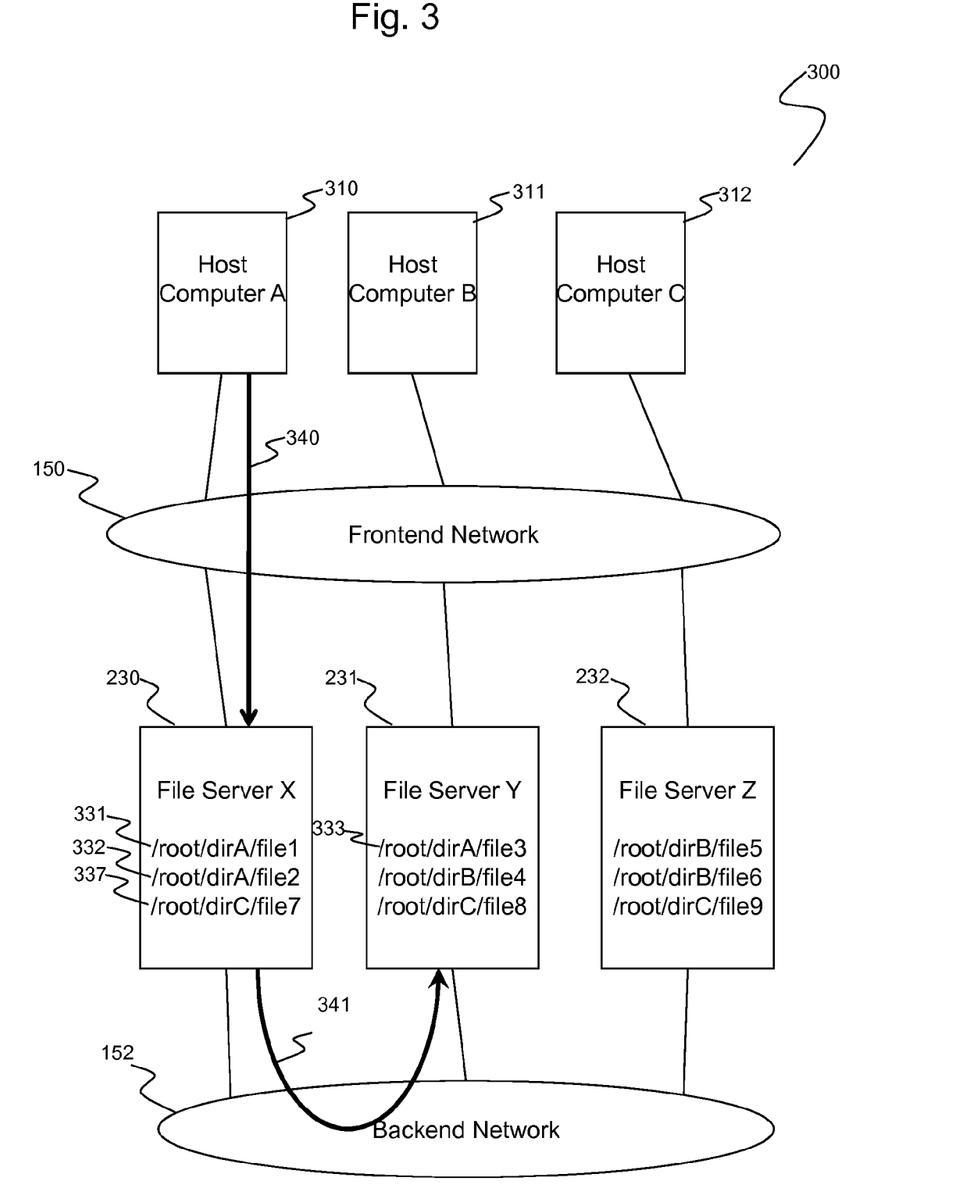
FIG. 3 illustrates an example of an information system in which a host computer requests access for a file among the file servers.

FIG. 3 illustrates an example of an information system 300 in which a host computer requests access for a file among the file servers. FIG. 3 especially illustrates an "in-band" approach. Each host server 310, 311, or 312 issues a file file I/O request (file access request) to one file server (for example, file server 230 in FIG. 3). Which file server is connected to each host computer depends on a distributed file system. For example, host computer A 310 can select its target file server to be file server X 230. Another example is that external server, such as DNS (Domain Name System) server, answers which file server a host computer should connect to.

File servers X 230, Y 231, and Z 232 communicate with each other to to exchange information about which files each file server manages and to show a client host computer the whole file tree, so the host computer A 310 knows the what files are stored in file servers X 230, Y 231 and Z 232. If the host computer A 310 issues a file I/O request 340 (file access request) for file 331 "/root/dirA/file1", the file server X 230, which receives the request, has the target file 331, and therefore can respond the target file 331 immediately to the host computer A 310. However, if the host computer A 310 issues a file I/O request 340 for file 333 "/root/dirA/file3", because the receiving file server X 230 does not have the target file 331, it redirects the I/O request via backend network 152, to the file server Y 231 which stores the target file 333, as shown by arrow 341. Then, the file server Y 231 processes the request and responds to the file server X 230, which in turn redirects the response to the requestor host computer A 310.

Figure 4A:
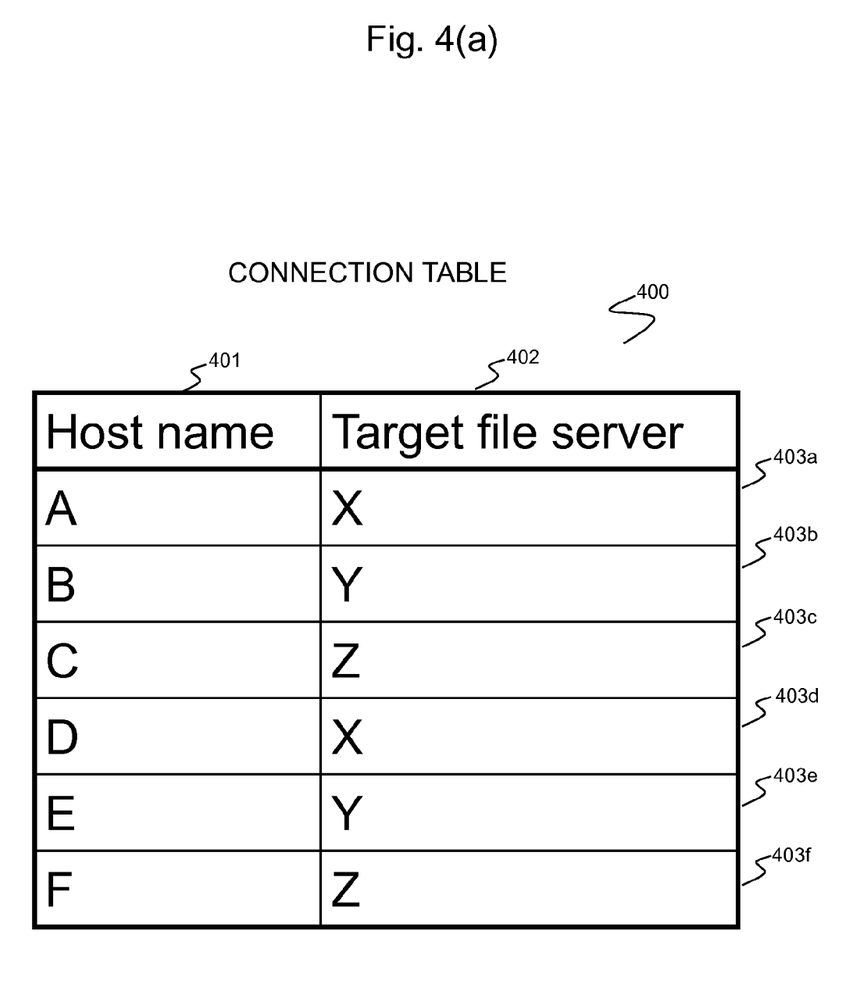
FIG. 4(a) illustrates an example of a connection table for load statics.
Figure 4B:
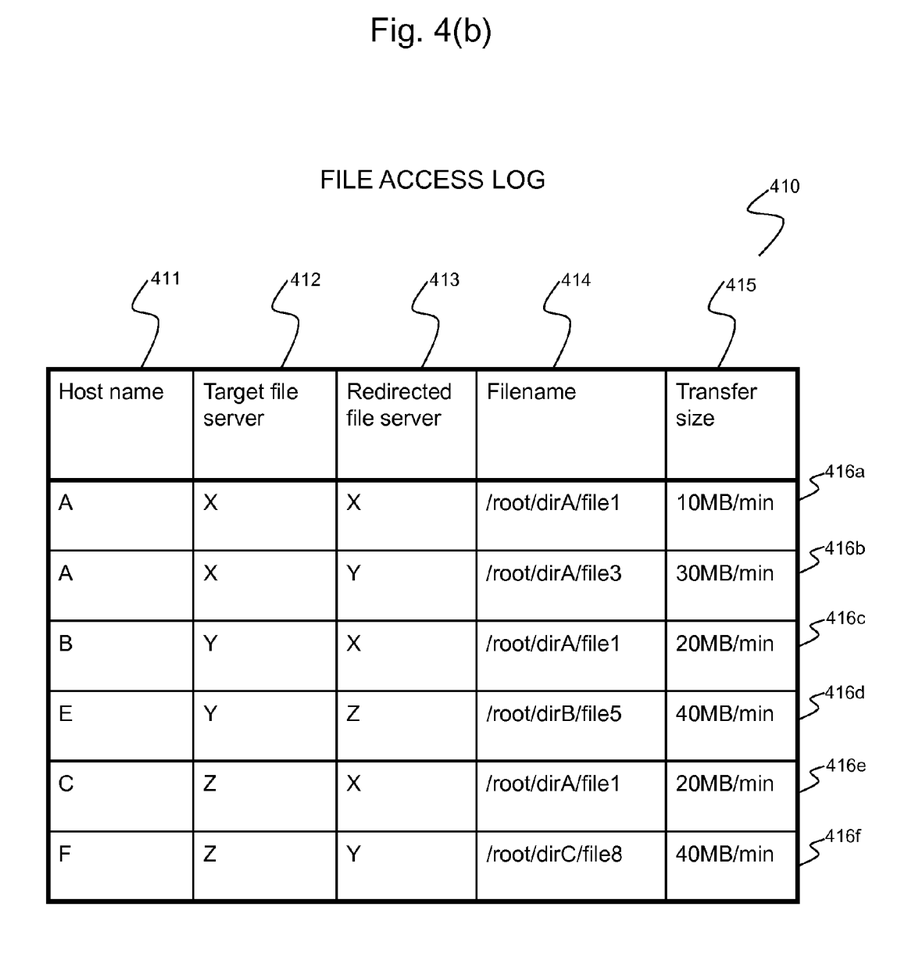
FIG. 4(b) illustrates a file access log which shows a file access statics for file access from each host computer.

FIG. 4(a) illustrates an example of connection table 400 for load statics. Load analysis program 163 in the management computer 160 of FIG. 1(c) collects information for load analysis. The connection table shows which host computer, represented by host name 401, connects to which file server, represented by target file server 402. FIG. 4(b) illustrates a file access log 410 which shows a file access statics for file access from each host computer. The file access log has entries including, but not limited to, host name 411 which represents a host computer, target file server 412 which represents file server to which the host computer communicates with as a target, redirected file server 413, which stores a target file of the host computer and to which the file access request from the host computer is redirected, file name 414 which is name of target file of the host computer, and transfer size 415, which is the total size of I/O for the file. Target file server 412 entry and redirected file server 413 entry can be optionally included as it is easy to know the target file server by referring to the connection table 400 and easy to know the redirected file server by knowing which file server stores the target file. Also, Resource usage of file servers 120 such as CPU load and memory usage, or throughput of the frontend network 150 can be included as load information.

Figure 5:
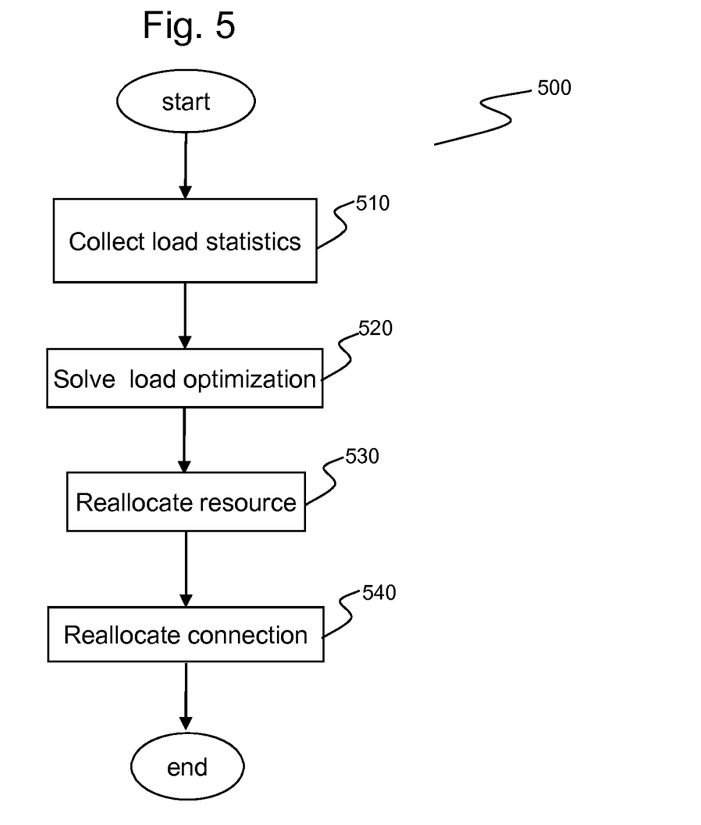
FIG. 5 shows a flowchart of load balancing process according to one of the embodiments of this invention.

FIG. 5 shows a flowchart 500 of load balancing process according to one of the embodiments of this invention. Load analysis program 163 in the management computer 160 performs a load balancing analysis at the timing specified by the administrator, periodically or when the some events such as load saturation occur in the information system.

At the beginning of the process, load analysis program 163 collects load statics from file servers, such as information shown in FIG. 5 (STEP 510). At the STEP 520, load analysis program 163 performs load optimization based on the load statics collected from file servers. Especially, load analysis program 163 specifies location of each file targeted by the host computer, and the target file server, with reference to the connection table 400 and the file access log 410, to distribute load among file servers X (230), Y (231), and Z (232) and to lower the total load of the storage system.

At STEP 530, load analysis program 163 performs a resource reallocation. Especially, resource reallocation program 164 receives the result of load optimization performed at STEP 520, and then reallocates resources. In this embodiment, the resource reallocation means file migration among file servers X (230), Y (231), and Z (232).

At STEP 540, load analysis program 163 performs reallocating of the connection between the host computers A (310), B (311), and C (312), and the target file servers X (230), Y (231), and Z (232). Especially, connection reallocation program 165 receives the result of resource reallocation and then reallocates the connection between the host computers A (310), B (311), and C (312), and the target file servers X (230), Y (231), and Z (232). In this case, the connection reallocation program 165 communicates with the host computers, the file servers and/or any other computer managing the connection such as DNS, and issues request for change of the connection to them.

Figure 6A:
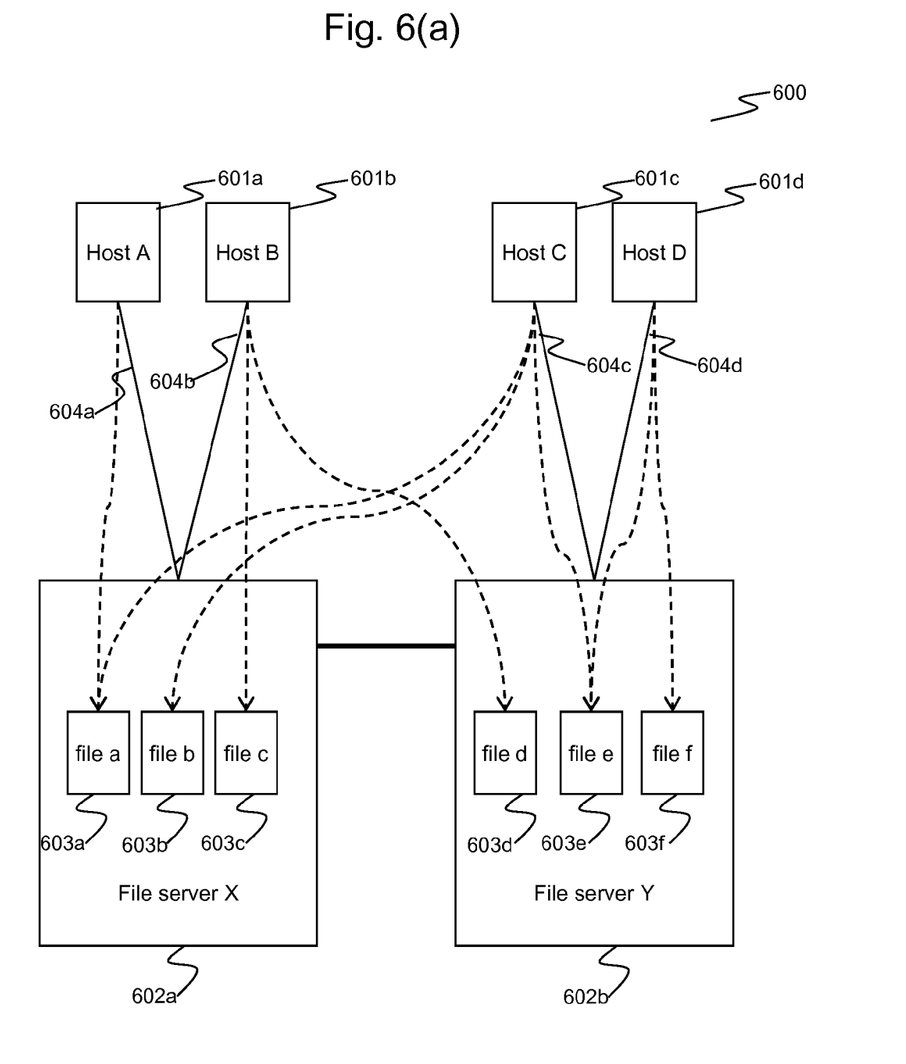
FIG. 6(a) illustrates another example of an information system in which a host computer requests a file access for a file among the file servers.
Figure 6B:
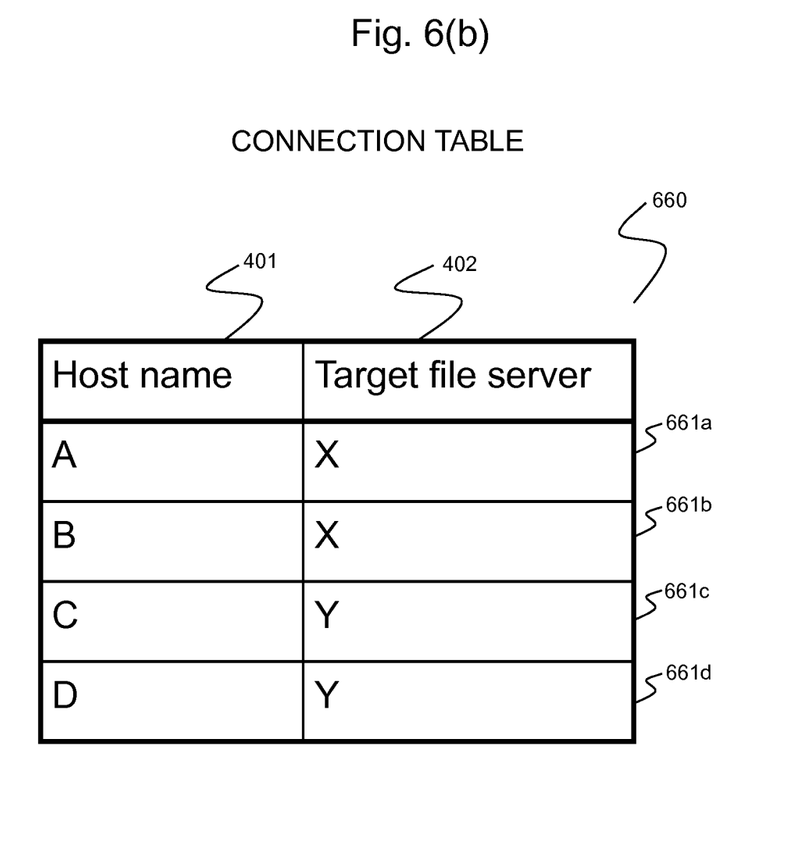
FIG. 6(b) illustrates a connection table used for the information system shown in FIG. 6(a).
Figure 6C:
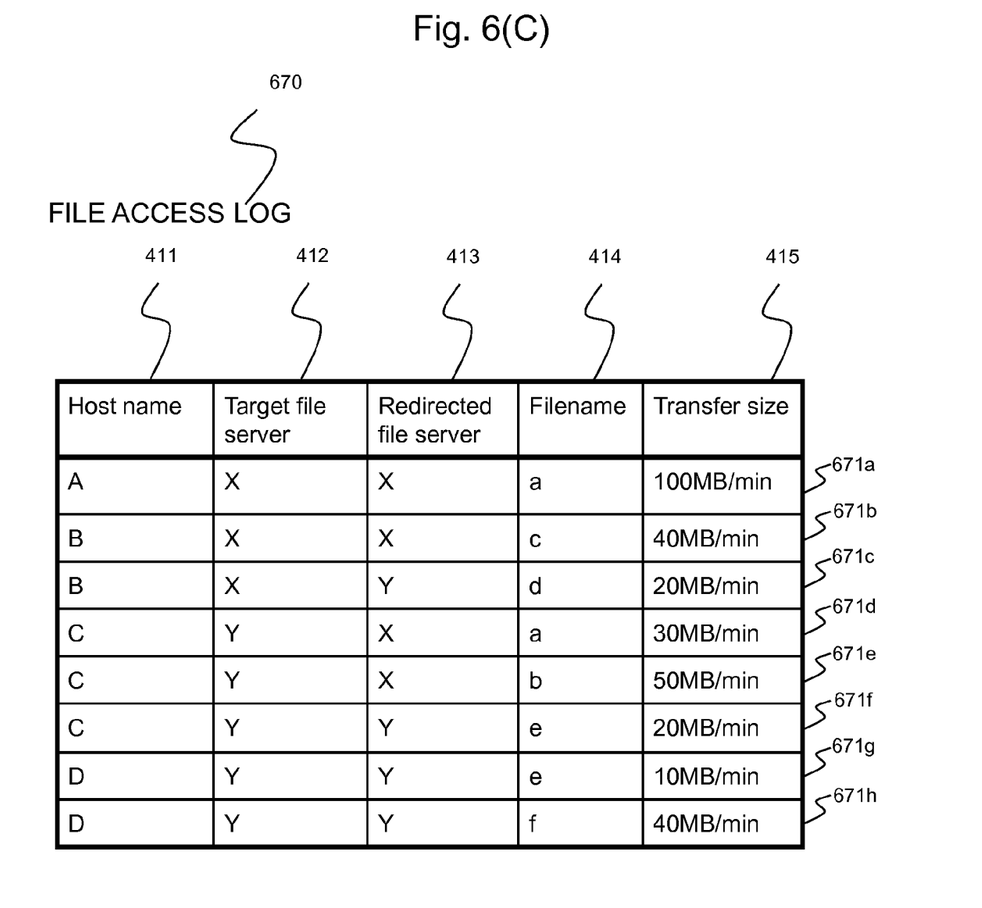
FIG. 6(c) illustrates a file access log which shows a file access statics for file access from each host computer shown in FIG. 6(a).
Figure 7A:
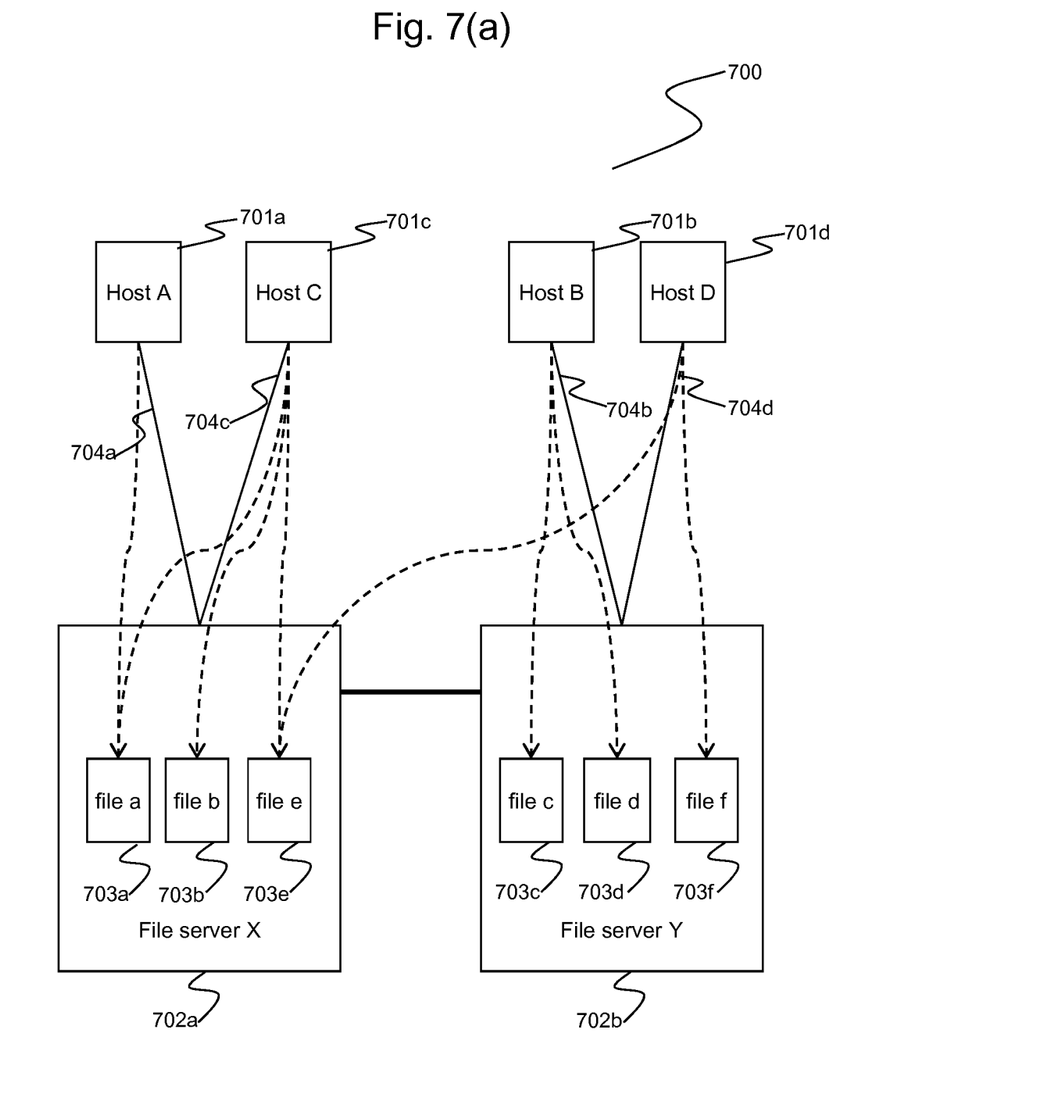
FIG. 7(a) illustrates the information system after the load balancing by the approximate method is performed to the system illustrated in FIG. 6(a).
Figure 7B:
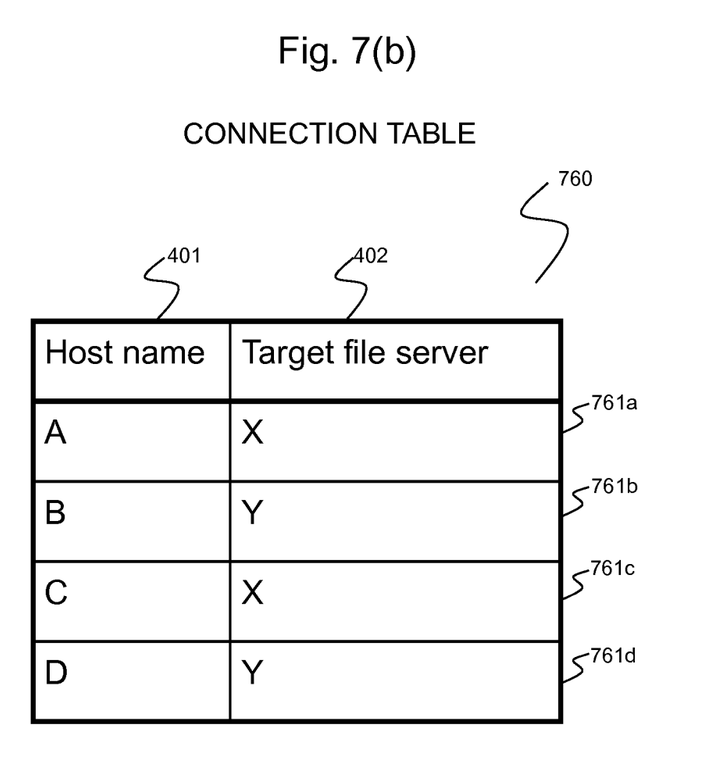
FIG. 7(b) illustrates a connection table used for the information system shown in FIG. 7(a).
Figure 7C:
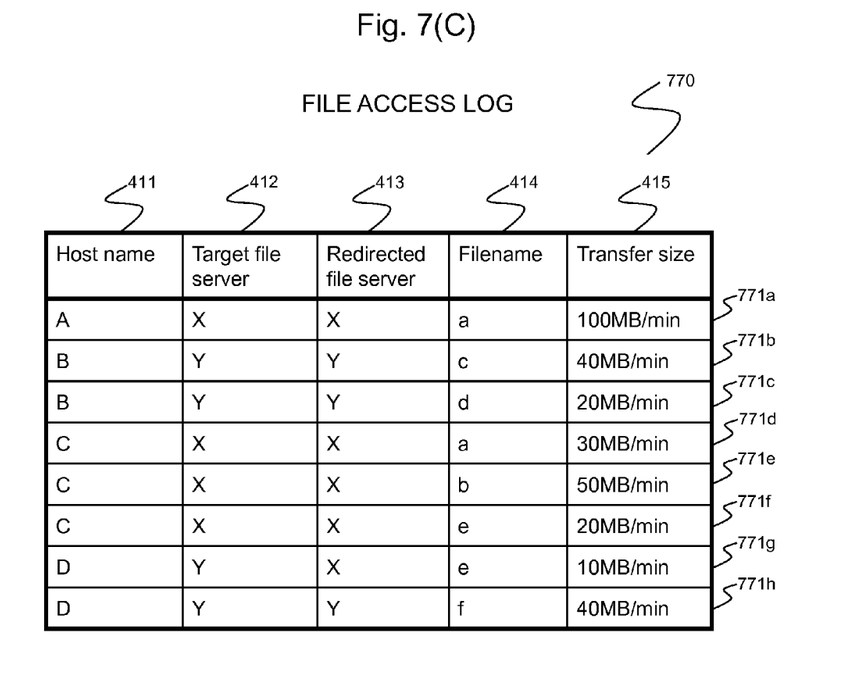
FIG. 7(c) illustrates a file access log which shows a file access statics for file access from each host computer shown in FIG. 7(a).

FIG. 6 and FIG. 7 illustrate an example to show how load balancing is performed in more detail. FIG. 6(a) illustrates another example of an information system 600 in which a host computer requests a file access for a file among the file servers. In the illustrated system, the host computers A 601a and B 601b access to the file server X 602a, and the host computers C 601c and D 601d access to the file server Y 602b, respectively. The file server X 602a stores files a 603a, b 603b, and c 603c, and the file server Y 602b stores files d 603d, e 603e, and f 603f. Solid lines 604a and 604b represent that the host computers A 604a and B 604b issue the access request to the file server X 602a, and the host computers C 604c and D 604d issue the access request to the file server Y 602b, while dotted lines represent that the each host computer issues the file access request to the target file or files.

FIG. 6(b) illustrates a connection table 660 used for the information system 600. The connection table 660 shows which host computer, represented by host name 401, connects to which file server, represented by target file server 402. FIG. 6(c) illustrates a file access log 670 which shows a file access statics for file access from each host computer. The file access log has entries including host name 411 which represents a host computer, target file server 412 which represents file server to which the host computer communicates with as a target, redirected file server 413, which stores a target file of the host computer and to which the file access request from the host computer is redirected, file name 414 which is name of target file of the host computer, and transfer size 415, which is the total size of I/O for the file. Target file server 412 entry and redirected file server 413 entry can be optionally included as it is easy to know the target file server by referring to the connection table 660 and easy to know the redirected file server by knowing which file server stores the target file.

To simplify, this example assumes size of every file 603a-603f is same. In this situation, at first glance, load seems to be well balanced as each file server X 602a or Y 602b has the same number of files, which is 3 files, and receives I/O requests from the same number of host computers, which is 2. However, as shown in FIG. 6(a) and the file access log 670, there remains 3 internode communications. In the file access log 670, entries 671c, 671d and 671e show difference between the target file server 412 and the redirected file server 413, and show inter-node communications. These entries show that the total size of inter-node communication is now 100 MB per minute.

In the above-mentioned load optimization step 520 in FIG. 5, load analysis program 163 may perform load optimization by reducing the inter-node communications. As one of the examples for performing load optimization, the brute-force method may be implemented. In this method, load analysis program 163 calculates every allocation pattern and chooses the best result. Assuming in FIG. 6(a) that the host computers A (601a)-D (601d) respectively connects to the file server X (602a) or Y (602b) and files a (603a)-f (603f) respectively located at the file server X (602a) or Y (602b), the host computer/the file server connection pattern will be 16 and the file allocation pattern will be 64, and therefore 1024 patterns will be obtained. Load analysis program 163 analyzes, for example, the transfer size of every pattern and chooses the best one of all. This approach is effective where the pattern of connection/allocation is not so many, while it is unreasonable where the pattern is many and the complexity becomes increased as the number of the host computers, file servers and files is increased.

As another approach for performing load optimization, an approximate method may be useful when the complexity becomes increased. According to the approximate method, load analysis program 163 makes the number of inter-connection less. FIG. 7(a) illustrates yet another example of an information system 700 in which a host computer requests a file access for a file among the file servers. In FIG. 7(a), the host computer B (701b) now connects to the file server Y (702b), and the host computer C (701c) connects to the file server X (702a). File c (703c) is migrated to the file server Y (702b), and file e (703e) is migrated to the file server X. In this embodiment, the number of connection between the host computers and the target file servers in FIG. 7(a) is the same as that in the system in FIG. 6(a), and the number of files allocated per a file server in FIG. 7(a) is also the same as in FIG. 6(a). However, the number of inter-connection between the file servers in FIG. 7(a) is less than that in FIG. 6(a). FIG. 7(a) shows only one inter-connection between the file server X (702a) and the file server Y (702b).

FIG. 7(b) illustrates a connection table 760 used for the information system 700. The connection table 760 shows which host computer, represented by host name 401, connects to which file server, represented by target file server 402. FIG. 7(c) illustrates a file access log 770 which shows a file access statics for file access from each host computer. The file access log has entries including host name 411 which represents a host computer, target file server 412 which represents file server to which the host computer communicates with as a target, redirected file server 413, which stores a target file of the host computer and to which the file access request from the host computer is redirected, file name 414 which is name of target file of the host computer, and transfer size 415, which is the total size of I/O for the file. Target file server 412 entry and redirected file server 413 entry can be optionally included as it is easy to know the target file server by referring to the connection table 760 and easy to know the redirected file server by knowing which file server stores the target file. FIG. 7(c) shows that the target file server listed in the target file server entry 412 is basically the same as the file server listed in the redirected file server entry 413. This embodiment achieves the reduction of total load of file servers X (702a) and Y (702b) by decreasing the number of inter-connection between the file servers.

What is claimed is:

1. A method of managing a file access, in a system which comprises a plurality of host computers, a network, and a plurality of file servers, respectively storing at least one or more files, wherein each of the host computers is connected with a target file server associated with the each of the host computers via the network, and issues a file access request to the target file servers, for access to a target file stored in one of the file servers, comprising the steps of:
   collecting a load information from the file servers;
   analyzing the load information, by specifying location of the target file and the target file server;
   redistributing the target file among the file servers based on the load information; and
   reallocating connection between the host computers and the target file servers,
   wherein the target file server redirects the file access request to a file server other than the target file server, if the file server other than the target file server stores the target file,
   wherein the load information comprises information of the target file server, information of the redirected file server, and transfer size,
   wherein the transfer size shows the size of inter-node communication between the target file server and the redirected file server, and
   wherein the target file is redistributed so that the total size of inter-node communication between the target file servers and the redirected file servers is reduced.

2. The method of claim 1, wherein the network comprises a frontend network and a backend network, and wherein the each of the host computers issues the file access request to the target file server via the frontend network and one of the file servers communicates with another via the backend network.

3. The method of claim 1, wherein the system further comprises a management computer which communicates with the host computers and the file servers via the network.

4. The method of claim 3, wherein the collection of the load information is performed at the management computer.

5. The method of claim 1, wherein the load information further comprises information of the each of the host computers, and information of the target file.

6. The method of claim 1, wherein the each of the host computers accesses the target file, by using a file tree, the file tree comprising a root directory and a subdirectory which has at least one or more files.

7. The method of claim 1, wherein the redistribution of the target file includes migrating the target file to the target file server.

8. The method of claim 1, wherein the reallocation includes connecting one of the host computers to one of the file servers other than the target server, and designating the one of the file servers as a new target file server.

9. A system comprising:
   a plurality of host computers;
   a network;
   a plurality of file servers, connected with the host computers via the network, the file servers respectively storing at least one or more files; and
   a management computer communicated with the host computers and the plurality of file server via the network;
   wherein each of the plurality of host computers is configured to issue a file access request to a target file server, for access to a target file stored in one of the plurality of file server,
   wherein the management computer is configured to collect a load information from the file servers,
   wherein the management computer is configured to analyze the load information, by specifying location of the target file and the target file server,
   wherein the management computer is configured to redistribute the target file among the file servers based on the load information,
   wherein the management computer is configured to reallocate connections between the host computers and the target file servers,
   wherein the target file server is configured to redirect the file access request to a file server other than the target file server, if the file server other than the target file server stores the target file,
   wherein the load information comprises information of the target file server, information of the redirected file server, and transfer size,
   wherein the transfer size shows the size of inter-node communication between the target file server and the redirected file server, and
   wherein the target file is redistributed so that the total size of inter-node communication between the target file servers and the redirected file servers is reduced.

10. The system of claim 9, wherein the network comprises a frontend network and a backend network, and wherein the each of the host computers issues a file access request to the target file server via the frontend network and one of the file servers communicate with another via the backend network.

11. The system of claim 9, wherein the load information further comprises information of the each of the host computers, and information of the target file.

12. The system of claim 9, wherein the redistribution of the target file includes migrating the target file to the target file server.

13. The system of claim 9, wherein the reallocation includes connecting one of the host computers to one of the file servers other than the target server, and designating the one of the file servers as a new target file server.

* * * * *